United States Patent
Neel

(10) Patent No.: US 8,029,289 B2
(45) Date of Patent: Oct. 4, 2011

(54) BACKLIT MAP WITH INTERCHANGEABLE PICTURES

(76) Inventor: Robert Eric Neel, Encinitas, CA (US)

( * ) Notice: Subject to any disclaimer, the term of this patent is extended or adjusted under 35 U.S.C. 154(b) by 948 days.

(21) Appl. No.: 11/944,466

(22) Filed: Nov. 23, 2007

(65) Prior Publication Data

US 2009/0136906 A1     May 28, 2009

(51) Int. Cl.
*G09B 25/00* (2006.01)
(52) U.S. Cl. ......................................... 434/365
(58) Field of Classification Search .............. 434/130, 434/145, 150, 153, 365; 40/361, 363, 367, 40/541; 362/97.1, 97.4, 223
See application file for complete search history.

(56) References Cited

U.S. PATENT DOCUMENTS

| | | | | |
|---|---|---|---|---|
| 2,567,561 A | * | 9/1951 | Hoffmann | 362/223 |
| 3,112,887 A | * | 12/1963 | Brou | 362/97.4 |
| 4,164,822 A | * | 8/1979 | Batton | 40/361 |
| 4,276,705 A | * | 7/1981 | Barth et al. | 40/579 |
| 4,454,669 A | * | 6/1984 | Simmons | 40/361 |
| 4,510,708 A | * | 4/1985 | Pokrinchak | 40/361 |
| 6,101,749 A | * | 8/2000 | Inbar et al. | 40/361 |
| 6,115,195 A | * | 9/2000 | Winters | 359/802 |
| 6,216,373 B1 | * | 4/2001 | Liao | 40/544 |
| 6,629,378 B2 | * | 10/2003 | Gustafson | 40/361 |
| 6,821,002 B1 | * | 11/2004 | Morgen | 362/351 |
| 7,654,023 B2 | * | 2/2010 | Peters et al. | 40/547 |
| 7,800,822 B2 | * | 9/2010 | Whitehead et al. | 359/443 |

FOREIGN PATENT DOCUMENTS

GB          2202070         * 9/1988

* cited by examiner

*Primary Examiner* — Kurt Fernstrom
(74) *Attorney, Agent, or Firm* — Eric Hanscom; Todd J. Langford

(57) ABSTRACT

This invention is directed toward a map overlaying a lighted display box. The map has a plurality of magnified eye holes though which a person can view lighted, magnified pictures or photographs. The map can be easily opened such that the pictures can be interchanged, such that a user may begin with a map containing generic, stock photos of various national parks, surf spots, or baseball stadiums, then, over time, as the user physically visits these locations he/she can replace the stock photos with personalized photos. The color of light can be changed as well once a location is visited, to give the user a sense of visual association and accomplishment.

17 Claims, 3 Drawing Sheets

BACKLIT MAP WITH INTERCHANGEABLE PICTURES

CROSS REFERENCE TO RELATED APPLICATIONS

None.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of maps and self-kept lists, and more specifically to backlit maps with interchangeable pictures, viewing capability, and keeping a physical record of locations visited. The invention is directed to a map overlaying a lighted display box. The map has a plurality of magnified eye holes though which a person can view lighted, magnified pictures or photographs. The map can be easily opened such that the pictures can be interchanged, such that a user may begin with a map containing generic, stock photos of various national parks, surf spots, or baseball stadiums, then, over time, as the user physically visits these locations he/she can replace the stock photos with personalized photos. The color of light can be changed as well once a location is visited, to give the user a sense of visual association and accomplishment.

Maps have been part of human history for thousands of years. Throughout history maps have served the dual purposes of identifying geographical features and allowing a traveler to keep track of where he or she has been. The educational benefit of maps is well illustrated in the prior art, as there are a number of backlit maps and magnified viewers which, in a hopefully entertaining manner, can educate viewers of the inventions about the contents displayed.

The prior art shows a number of backlit maps. U.S. Pat. No. 4,790,756 to Caldwell teaches a rotatable globe with a backlit viewer, as does U.S. Pat. No. 2,492,691 to Dietz. U.S. Pat. No. 5,226,725 to Trusiani describes a hollow housing, either in flattened or globe form, with back lighting. There are several holes drilled into the map so that they will stand out against the map when the room is darkened. U.S. Pat. No. 4,164,822 to Batton teaches a backlit light box with a translucent map. However, none of these inventions allow for interchangeable photos so that a person can customize his or her map.

Magnified viewers are known in the prior art as well. For example, U.S. Pat. No. 2,182,334 to Crespo teaches a magnified panoramic viewing device. U.S. Pat. No. 4,451,874 to Friedman illustrates another approach to this idea, namely, a magnifying glass located in stationary position over a rotatable globe, where the user of the invention moves the globe to get a magnified view of a particular area. U.S. Pat. No. 4,790,756 to Caldwell teaches a rotatable globe with longitudinally spaced viewing images of different locations, while U.S. Pat. No. 2,572,602 to Dilks, U.S. Pat. No. 1,989,454 to Koster and U.S. Pat. No. 2,706,429 to Frankel show other versions of picture viewing devices. Magnified map viewers are also not novel, as evidenced by U.S. Pat. No. 4,149,783 to Latady, which shows a miniature map viewer with a magnifying lens to more clearly see the details of a map. U.S. Pat. Nos. 6,055,115 to Davis and 5,458,492 to Holguin illustrate magnifying map viewers in which a map is slid in between an upper panel and a lower panel, where the upper panel is a magnifying lens which enlarges the map details. The magnified viewers do not envision interchangeable photos The prior art also provides several examples of maps where the user of the map can modify a map to keep track of locations visited. For example, a common example frequently seen on the backs of campers and RVs is a map of the United States divided up by lines into the individual states, where once a traveler visits a particular state he/she purchases a colored piece of self-adhesive plastic in the shape of that state and affixes it to the map, thereby keeping a record of states visited. These maps, however, lack means to customize the map according to photos purchased or taken by the user of the invention.

With respect to non-vehicular modifiable maps, U.S. Pat. No. 4,595,367 to Forsyth teaches an instruction globe with detachable appendages designed to assist students in learning geography. The Forsyth globe can be constructed from different shapes of continents and oceans, and have various symbols such as dolphins which can be inserted in receptacles in appropriate locations such as oceans. Through the Forsyth globe, a teacher can track to progress of students by noting whether the students understand that dolphins belong in the ocean and bears belong on land. U.S. Pat. No. 4,103,436 to Strussion provides a series of recessed portions into which shapes, such as the states of the United States, can be removably attached. While these inventions meet a need for basic instruction, they do not provide means by which a person can use such a map to keep track of places visited.

Thus there has existed a long-felt need for a map which is backlit for easy viewing, has magnification capabilities, has interchangeable pictures and other means by which a person can keep track of his or her travels.

The current invention provides just such a solution by combining a map with means to view and removably switch images. The map overlays a lighted display box, where the box is made from wood, plastic, or any other sturdy material. The source of light can be bulb, incandescent, or fluorescent lighting, and can be powered by an electrical cord connecting to a wall outlet, batteries, or solar. The map forms the lid of the box and is rotationally attached by hinges, such that the interior of the box can be easily accessed. The map has a plurality of magnified eye holes though which a person can view lighted, magnified pictures or photographs. These eye holes are located at specific locations on the map where unique geographical or other features are located. The hinges allows the user of the invention to easily interchange the pictures, such that a user may begin with a map containing generic, stock photos of various national parks, surf spots, or baseball stadiums, then, over time, as the user physically visits these locations he/she can replace the stock photos with personalized photos. The color of light can be changed as well once a location is visited, to give the user a sense of visual association and accomplishment.

The map is particularly suited to be used for "life lists" for birds, and other collection-related hobbies. For example, a birder could purchase a map of common birds of a particular state with the eyeglass magnifier located somewhere near where that bird is normally found. Once of birder saw such a species, he/she could take a picture of that bird and replace the generic picture with the personal picture along with a tag which gave the date and location the bird was seen. A fisherperson could purchase a map showing the common lake, near shore or offshore fishes found in a particular location, then replace the generic pictures which personalized pictures of a specific fish caught by the user of the invention when such a fish was caught. Allowing the user of the invention to change the light color, or the filter through which the light is emitted, to signify "checking one off the list" would be an enjoyable activity that a hobbyist or and entire family could enjoy together.

The map is equally suited for visitation-related hobbies. For example, the maps that are seen on the outside of many campers are placed there to let others know how well traveled the occupants are—if the travelers were only interested in keeping track privately of how many states they had visited, they could more easily an inexpensively keep a record on a computer or even paper map. Instead, it is part of the sense of accomplishment to make a record of one's travels well know to all who view the camper. Thus, being able to replace a generic picture of particular locations with a personalized picture of the user of the invention at that location would be particularly rewarding to many people.

In addition to maps representing particular geographic locations, a map representing locations in which various sports or other activities are practiced would be quite popular. Many surfers keep records of how many surf spots they have visited, many climbers keep meticulous records of the dates and climbing party members with them when they ascended various mountain faces and peaks.

Another embodiment of the invention involves the map portion representing a sports stadium, such as a baseball diamond. It is contemplated that such a map could represent a famous team of the past, such as the 1927 New York Yankees, or an "All Century Team" of the best player at each position during the 1900's. The map could also be filled with the current starting players for a local team, or a fantasy team, such that a user of the invention could exchange pictures of certain players when they were traded, retired, or were "benched" and replaced by other starting players.

SUMMARY OF THE INVENTION

It is a principal object of the invention to combine a light box with a map as the lid to the box with magnifying eye pieces and means by which the objects to be viewed in the box can be removed and replaced.

It is another object of the invention that the interior of the box is easily accessible through hinges such that lights can be replaced when they burn out, and pictures can be replaced at will.

It is an additional object of the invention that the map can be used for a variety of geographical locations and collectible hobbies.

A further object of this invention is that it can be powered by an electrical connection to an electrical outlet, batteries, or solar power.

It is a further object of the invention that a user of the invention can modify the map by replacing generic or stock pictures with personal pictures, or by modifying the color of light illuminating that particularly eye hole.

It is also an object of this invention that the invention serve as a family history along with educating and entertaining the children.

It is a final object of this invention that the invention be manufactured from commonly available materials and be relatively inexpensive in price.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

DETAILED DESCRIPTION OF THE FIGURES

Figure 1:
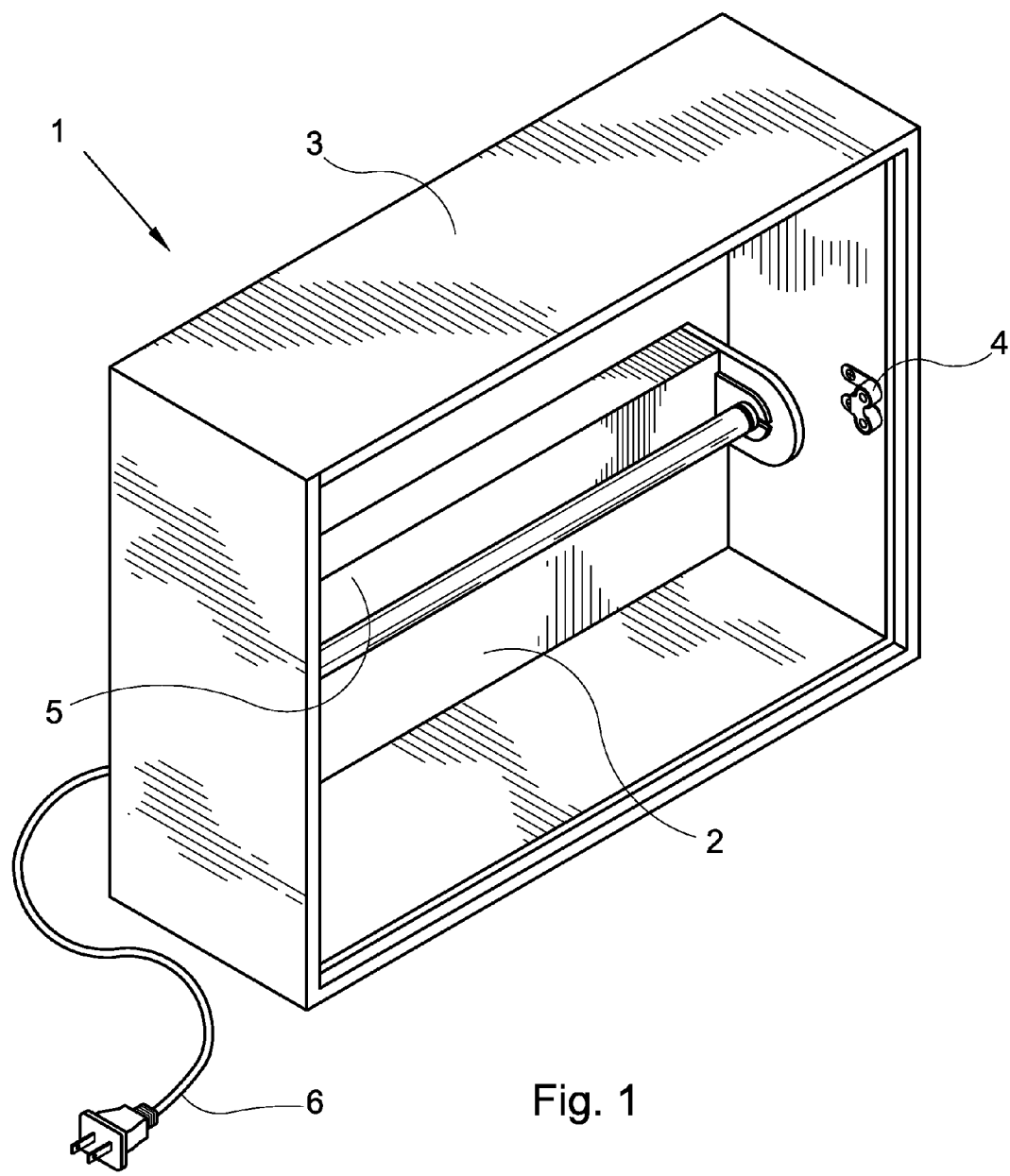
FIG. 1 is a perspective view of the box which holds the light fixture and supports the map.

FIG. 1 is a perspective view of the box which holds the light fixture and supports the map. The box, generally referenced by reference number 1, is constructed of wood, plastic, or a similarly strong material. The box has a bottom 2 and sides 3. The embodiment of the invention shown here is a rectangular box, but square boxes, triangular boxes, circular boxes, elliptical boxes, and boxes of other shapes are all possible and are considered part of this invention. Attached to the bottom 2 is a light fixture 4, which includes at least one light emitting device 5, such as a light bulb or fluorescent bulb. The light emitting device is removably connected to a power supply by an electrical cord 6. The box also has located on its sides 3 at least one means of connection 4 by which the top (not shown in this figure) can be removably attached to the box. A preferred embodiment of the invention calls for the means of connection to be latches, but other means of attachment such as snaps, magnets, butterfly clamps and other known devices are contemplated and are considered part of this invention.

While this embodiment shows a single fluorescent bulb illuminating the entire map, it is envisioned that individual LED's (light emitting diodes) could also be used under each image. With the embodiment utilizing single LED's under each view hole, a user of the invention could change the color of the LED to signify a location visited, or to otherwise personalize the map to his or her desires.

Figure 2:
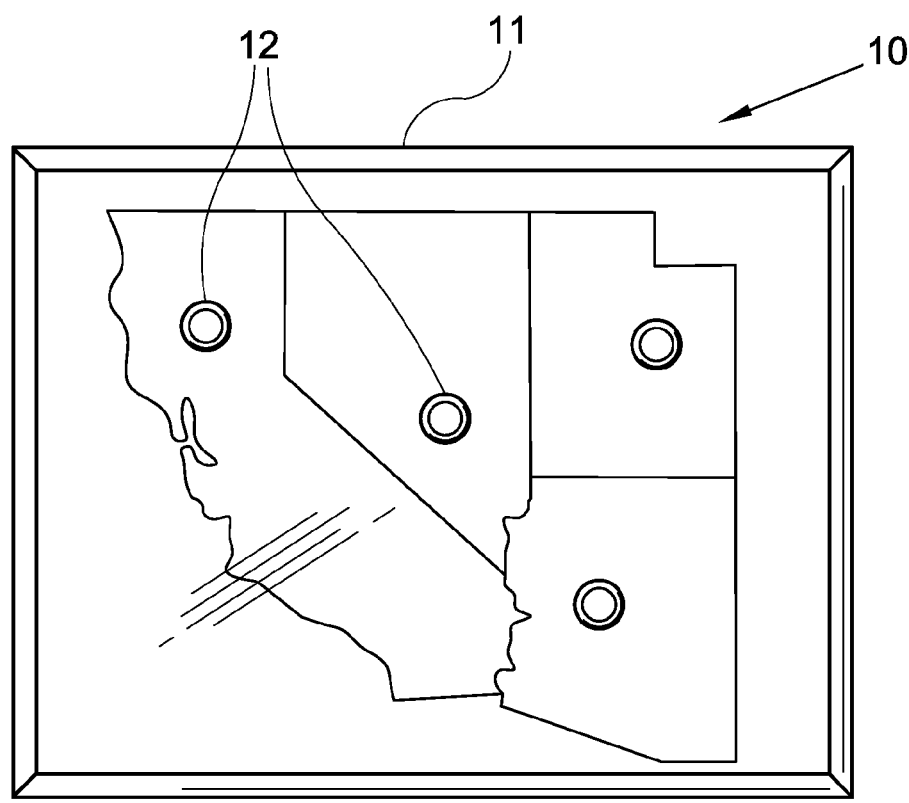
FIG. 2 is a top view of a map of California, Nevada, Utah and Arizona, showing the eyeglass magnifiers location near key locations.

FIG. 2 is a top view of a map of California, Nevada, Utah and Arizona, showing the eyeglass magnifiers location over key locations. The map, generally referenced by reference number 10 is in this case a square map of the southwestern United States. The map has an edge 11, which mates with the sides of the box (not shown in this figure), and a plurality of key holes 12 located at specific locations on the map, near locations of interest, under which pictures can be placed.

Figure 3:
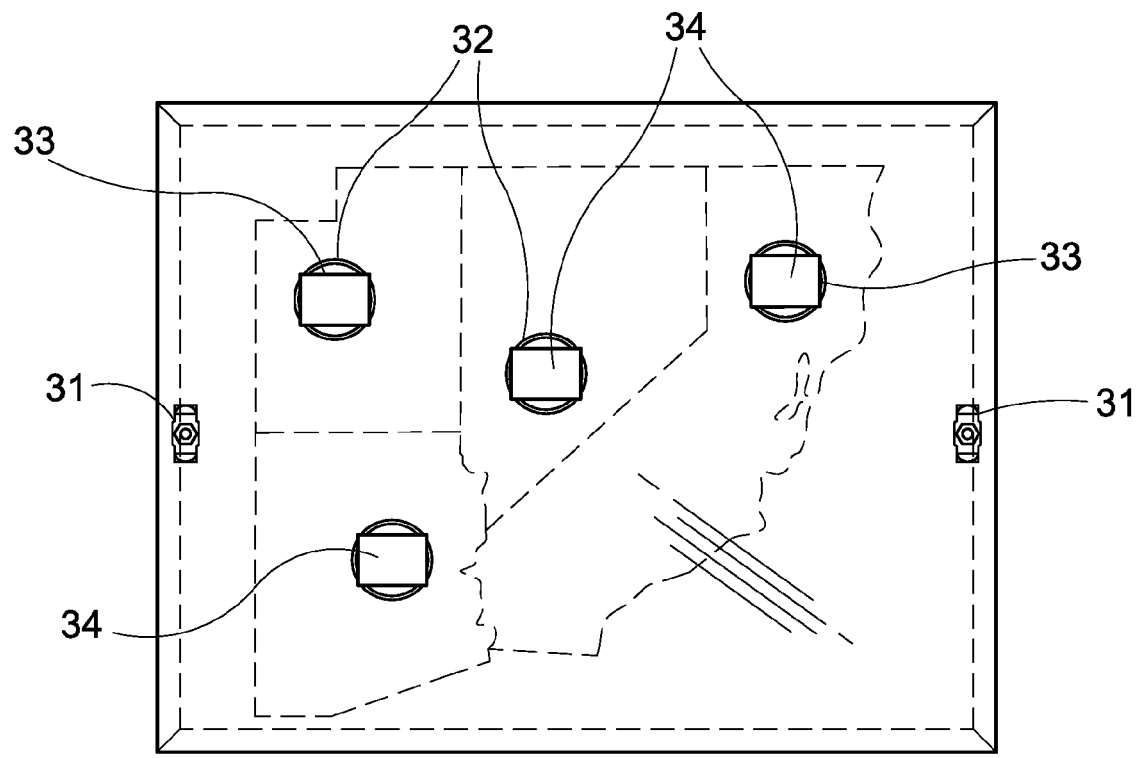
FIG. 3 shows a back view of the map of FIG. 2, showing how the images can be secured beneath each of the eyeglass magnifiers.

FIG. 3 shows a back view of the map of FIG. 2, showing how the images can be secured beneath each of the eyeglass magnifiers. The back of the map has opposing means of connection—here opposing latches—31, which mate with the latches illustrated in FIG. 1. On the back of each eyeglass magnifier 32 is a mounting bracket 33 which secures an image 34 to the eyeglass magnifier 32. The mounting bracket 33 can use any commonly available technology. As the light emitting device of FIG. 1 emits light, the light illuminates the image 34, which is enlarged to the human eye by the eyeglass magnifier 32. Because of the ease with which the mounting bracket 33 can be released, the image 34 is very easy to change.

Figure 4:
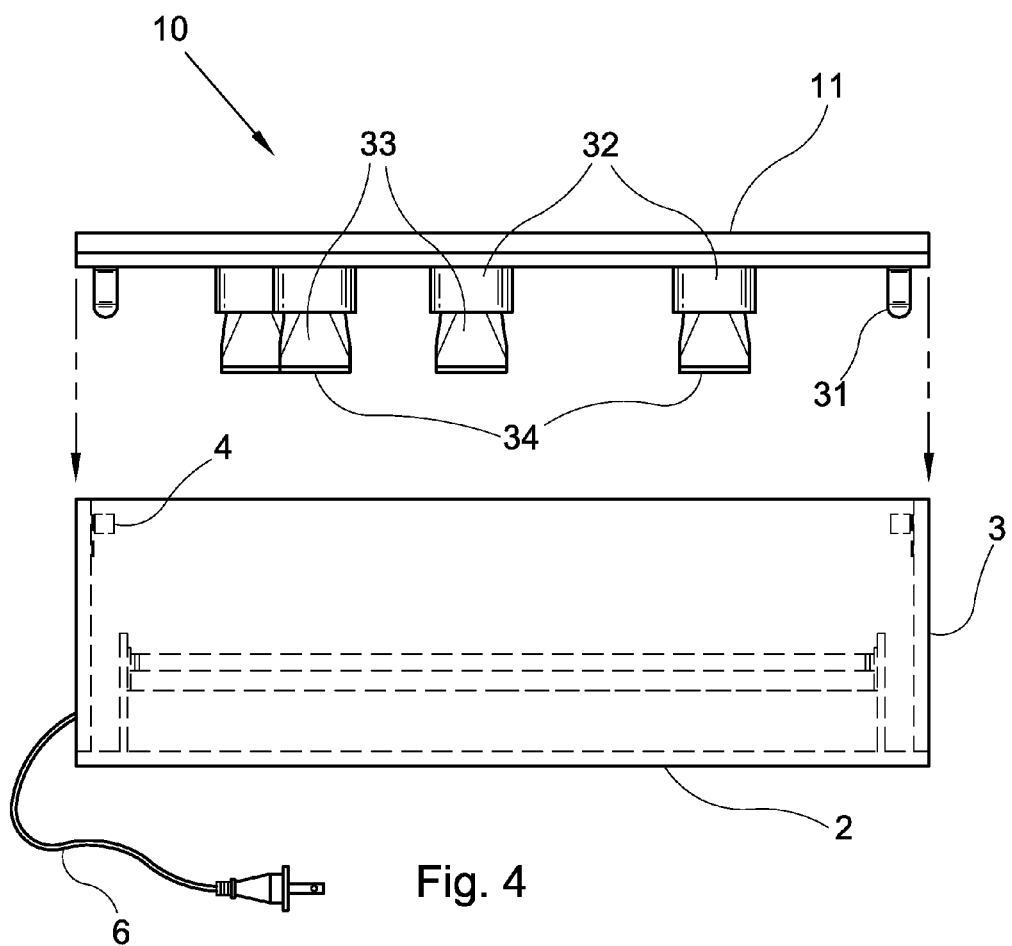
FIG. 4 is a side view the map, with the eyeglass magnifiers and the images, ready to be removably attached to the box.

FIG. 4 is a side view the map, with the eyeglass magnifiers and the images, ready to be removably attached to the box. The box comprises sides 3 and a bottom 2, and an electrical cord 6, in addition to a light fixture and light emitting device which are not shown in this figure. The map 10 has map edges 11 which mate with the sides 3 of the box. On the bottom side of the map, the eyeglass magnifiers 32 are located under eyeholes in the map surface. The mounting brackets 33 secure the images 34 to the eyeglass magnifiers 32.

What I claimed is:

1. A map, comprising:
   a box, where the box comprises one or more sides, a bottom, where the bottom is secured to the one or more sides, and where the bottom and sides are made from tough material,
   a map, where the map is comprised of a flat sheet of durable material, where the map has one or more edges, and where the map contains one or more view holes where the view holes allow a user of the invention to look through the map,
   where the map is removably attached to the sides, such that the map can be removed from the sides,
   one or more light sources,
   a plurality of eye glass magnifiers, where the eye glass magnifiers are located under the view holes,
   a plurality of mounting brackets, where a mounting bracket is located under each eye glass magnifier,
   where the eye glass magnifier is mounted to the mounting brackets,
   a plurality of images, where an image can be removably secured in each mounting bracket, where the plurality of images relate to one or more points of interest,
   where, the one or more light sources illuminate the image such that when a user of the invention looks through a particularly view hole, he/she sees the image and where the image is magnified by the eye glass magnifier, and,
   where, a user of the invention can remove the map from the sides through releasing the map from the sides release the mounting bracket, and replace a particular image with another image.

2. The map of claim 1, where, the map is a geographical map and the points of interest are physical locations.

3. The map of claim 2, where the points of interest are nationally recognized physical locations.

4. The map of claim 2, where the points of interest are surf spots.

5. The map of claim 1, where the map is a view of a natural setting and the points of interest are one or more plants or animals.

6. The map of claim 1, where the map comprises a representation of a sports field and the plurality of eyeglass magnifiers are located at various parts of the sports field representing different positions for a particular sport, and the images are of different players who play in different positions of the particular sport.

7. The map of claim 1, where the map represents a modern sports team and the images can be changed when various players are traded, retire, or are "benched" and replaced with other starting players.

8. The map of claim 7, where the map represents a past sports team or a collection of famous sports figures of a particular sport, and the images represent players of the past, either members of a certain famous team, or a group of players particularly known for their skills.

9. The map of claim 7, where the map represents a past sports team or a collection of famous sports figures of a particular sport, and the images represent players of a fantasy sports team, where the user of the invention plays a role of a sports team manager, and can change the image in a particular position whenever a player is traded to another person's fantasy team.

10. The map of claim 1, additionally comprising means for changing the color of the light emitted from the hole.

11. The map of claim 10, where the means for changing the color of the light emitted from the view hole is a replaceable glass viewing piece, which is available in more than one color.

12. The map of claim 10, where the means for changing the color of the light emitted from the view hole comprises at least two colors of LED's where the user of the invention can remove the map and change the color of LED under a particular image.

13. A method of providing education and entertainment comprising the steps of: first, obtaining a map, where the map comprises:
    a box, where the box comprises one or more sides, a bottom, where the bottom is secured to the one or more sides, where the bottom and sides are made from wood, metal, or plastic,
    a map, where the map is comprised of a flat sheet of durable material, where the map has one or more edges, and where the map contains one or more view holes where the view holes allow a user of the invention to look through the map,
    where the map is removably attached to the sides,
    such that the map can be removed from the sides,
    one or more light sources,
    a plurality of eye glass magnifiers, where the eye glass magnifiers are located under the view holes,
    a plurality of mounting brackets, where a mounting bracket is located under each eye glass magnifier,
    where the eye glass magnifier is mounted to the mounting brackets,
    a plurality of images, where an image can be removably secured in each mounting bracket, where the plurality of images relate to one or more points of interest,
    where, the one or more light sources illuminate the image such that when a user of the invention looks through a particularly view hole, he/she sees the image and where the image is magnified by the eye glass magnifier, and,
    where, a user of the invention can remove the map from the sides through releasing the map from the sides, release the mounting bracket, and replace a particular image with another image,
    second, using the map as part or an educational, collecting, or entertaining function,
    third, replacing one or more images to enhance the educational, collecting, or entertaining function.

14. The map of claim 13, where the map additionally comprises means to change the color of the light emitted from the hole.

15. The map of claim 14, where the means for changing the color of the light emitted from the view hole is a replaceable glass viewing piece, which is available in more than one color.

16. The map of claim 14, where the means for changing the color of the light emitted from the view hole comprises at least two colors of LED's where the user of the invention can remove the map and change the color of LED under a particular image.

17. A map, consisting of:
    a box, where the box comprises one or more sides, a bottom, where the bottom is secured to the one or more sides, where the bottom and sides are made from wood, metal, or plastic,
    a map, where the map is comprised of a flat sheet of durable material, where the map has one or more edges, and where the map contains one or more view holes where the view holes allow a user of the invention to look through the map, where the map is removably attached to the sides, such that the map can be removed from the sides, one or more light sources, a plurality of eye glass magnifiers, where the eye glass magnifiers are located under the view holes, a plurality of mounting brackets, where a mounting bracket is located under each eye glass magnifier, where the eye glass magnifier is mounted to the mounting brackets, a plurality of images, where an image can be removably secured in each mounting bracket, where the plurality of images relate to one or more points of interest, where, the one or more light sources illuminate the image such that when a user of the invention looks through a particularly view hole, he/she sees the image and where the image is magnified by the eye glass magnifier, and, where, a user of the invention can remove the map from the sides through releasing the map from the sides, release the mounting bracket, and replace a particular image with another image.

* * * * *